June 22, 1948.   S. J. McDERMOTT ET AL   2,443,631
DEVICE FOR SIMULATING RADARSCOPE IMAGES
Filed March 22, 1946   2 Sheets-Sheet 1

INVENTORS: H. J. KOSTKOS
S. J. McDERMOTT
BY
H. A. Burgess
ATTORNEY

June 22, 1948.   S. J. McDERMOTT ET AL   2,443,631
DEVICE FOR SIMULATING RADARSCOPE IMAGES
Filed March 22, 1946   2 Sheets-Sheet 2

INVENTORS: H. J. KOSTKOS
S. J. MC DERMOTT
BY
ATTORNEY

Patented June 22, 1948

2,443,631

UNITED STATES PATENT OFFICE 2,443,631

DEVICE FOR SIMULATING RADARSCOPE IMAGES

Scott J. McDermott, Port Washington, N. Y., and Henry J. Kostkos, Westfield, N. J., assignors to Bell Telephone Laboratories, Incorporated, New York, N. Y., a corporation of New York Application March 22, 1946, Serial No. 656,296

7 Claims. (Cl. 35—10)

This invention relates to a demonstration device and more particularly to a device for simulating by optical means the indications produced by an electronic radar.

An object of the invention is to facilitate the demonstration of radar operation.

A more specific object of the invention is to simulate by relatively inexpensive and simply controlled means, the indications produced by an electronic radar.

The sensational part played by radar in wartime has gradually become known and it has been generally recognized that there are also very important applications of radar during peacetime. Examples of such peacetime applications are navigation of merchant vessels during periods of poor visibility and navigation of aircraft during such low visibility periods.

The name "radar" is coined from the words which indicate its general function, i. e. "radio detection and ranging"; in other words, a device for detecting and indicating the location of objects by radio. Radar, in general, operates on two basic principles, the first being that radio waves are reflected from solid objects much like echoing sound waves and the second being that very high frequency (short) radio waves can be focused in a beam much like a searchlight. In operation a radar transmits separate, short, powerful pulses of high frequency radio waves and receives echoes from any reflecting body in the paths of the waves, the time elapsing between transmission of each pulse and receipt of the resulting echo being computed. The information is translated into an image on the face of a cathode ray tube which operates in a manner generally similar to that of a television image tube. The radar cathode ray tube is usually referred to as the "scope."

In general, radio wave reflecting bodies such as land, ships, etc., are shown on the scope as "bright" spots or areas while non-reflecting bodies such as water are "dark" on the scope.

Various types of radar scope presentations have been developed depending upon the particular function intended and the specific nature of the image that it is desired to produce; one type is that known as the Plan position indicator or P. P. I. With this type of radar, the antenna which is scanning the target terrain or "area" rotates in a full circle. A luminous line moves commensurately around the face of the scope. As the luminous line rotates over the scope it leaves a map-like reproduction of the area being scanned, i. e., all radio wave reflecting objects in the scanned area are reproduced as "bright" areas on the scope. This reproduction will be at its brightest at and immediately following the luminous line, that is, the portion corresponding to the portion of the area actually being scanned at the moment. As the luminous line traverses the scope any given point in the image will gradually fade out or decay after the line passes on only to again resume full brilliance when next "scanned" by the luminous line. The amount of this image decay is characteristic of the particular scope and will vary with different types of tubes. In some instances the image may practically disappear during a full rotation of the scanning line while in other instances the image may remain at practically full intensity at all times.

The device contemplated by the present invention is intended particularly for demonstrating the type of indication produced by the plan position indicator type radar.

A plan position indicator radar is a relatively complicated and expensive device and is not readily adaptable for demonstration. Occasions frequently arise, however, when it would be particularly advantageous to be able to demonstrate with exactness the type of indication produced by a plan position indicator radar without involvement of the expense and inconvenience attendant upon use of an actual radar. For example, a demonstration device of the type contemplated by the present invention would be useful in connection with sales programs and for general demonstration or educational purposes, as at conventions, in scientific museums and other public places.

In connection with such demonstrations, particularly those made for training and sales purposes, it is advantageous to be able to simulate the various degrees of image decay resulting from use of various types of radar scopes.

A feature of the present invention is an arrangement of disks whereby the simulation of various degrees of decay of the image is readily provided for as well as the simulation of various terrains or targets.

In accordance with a specific embodiment of the invention, a device for simulating the action of an electronic radar comprises a cylindrical housing of a size demanded by the contemplated number of viewers. Within the housing or casing there is provided a suitable source of light such as a plurality of incandescent lamps. Between the light source and the open end of the housing, which faces the viewers, are positioned a series of disks one of which carries a reproduction of the indication obtained on an actual radar scope when a particular terrain is scanned and another of which is of progressively varying transparency and is rotated between the light source and the terrain disk to give the illusion of scanning and of the decay and return of the image. A third disk is provided which may on occasion be tinted to give the desired color value, for example, amber or green, to the reproduction.

A complete understanding of the arrangement and operation of the device contemplated by the present invention may be gained from consideration of the following detailed description taken with the accompanying drawings in which.

Figure 1:
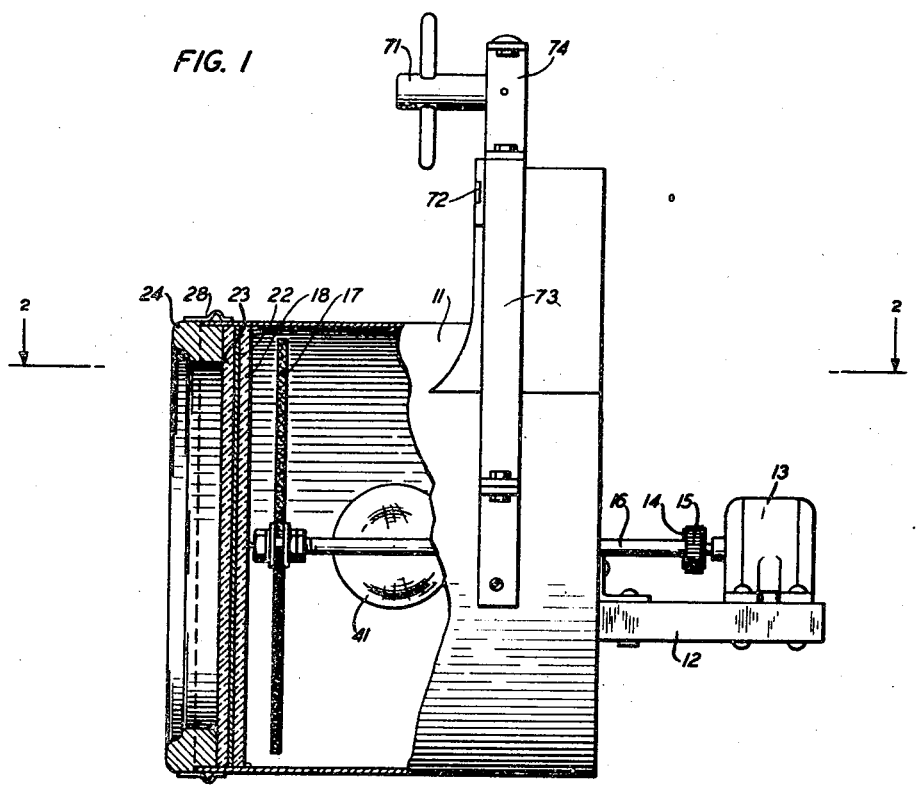
Fig. 1 is a side elevation view of a demonstration device which embodies features of the present invention, a portion of the view being in section to show the arrangement of the disks.
Figure 2:
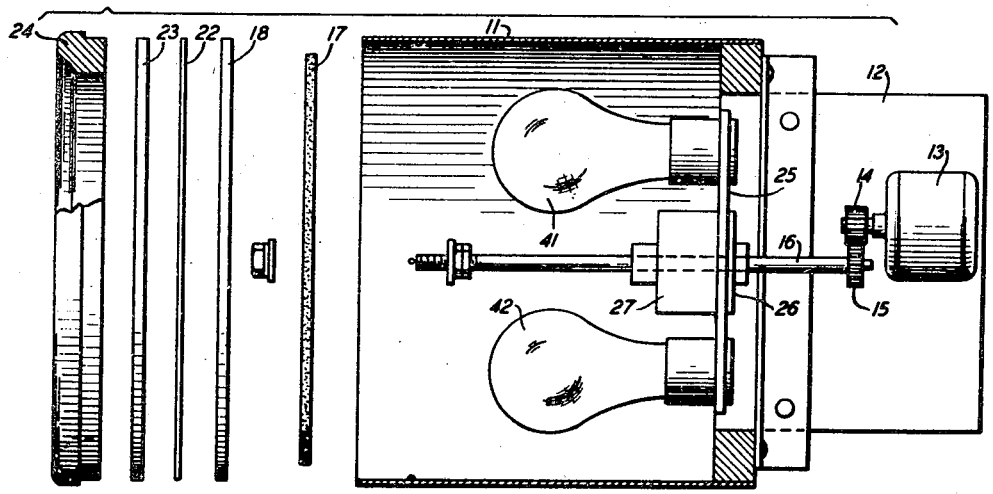
Fig. 2 is a sectional view taken on line 2—2 of Fig. 1, the disks being shown "exploded"

Referring now to the drawings, there is illustrated in Figs. 1 and 2, a demonstration device having a cylindrical housing 11, upon which is supported a rearwardly extending platform 12. Motor 13 is supported on platform 12 and drives through suitable gears 14 and 15, rotatable shaft 16; "scanning" disk 17, which will be described in detail subsequently, is mounted on shaft 16 and is rotatable thereby. Suitable nuts and washers are provided for positioning disk 17 on shaft 16.

An assembly of three disks, i. e., "backing" disk 18, "terrain" disk 22 and "color" disk 23, all of which will be described in detail subsequently, is positioned at the open front or viewing end of housing 11. Collar 24 serves to hold the disk assembly in proper position.

A circular locking band 28 of spring metal is provided for removably supporting collar 24 in position; collar 24 in turn holds the disk assembly in position.

Mounting plate 25 is positioned within housing 11 near the rear end thereof. Shaft 16 passes through plate 25, suitable bearing members 26 and 27 being provided for proper support of the shaft.

A suitable light source, which may comprise incandescent lamps 41 and 42 mounted on plate 25, is provided within housing 11.

It will be understood, of course, that although not illustrated, suitable controlled energizing sources for motor 13 and for lamps 41 and 42 will be provided.

Figure 3:
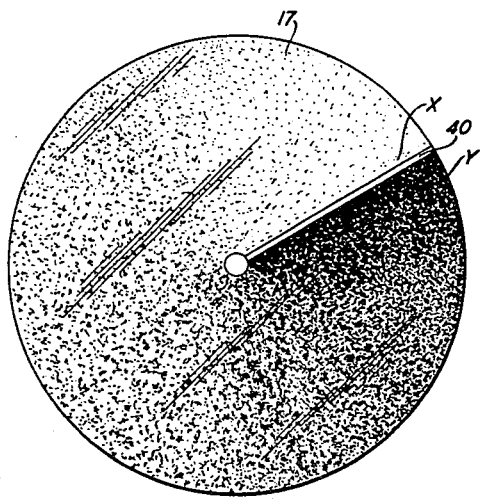
Fig. 3 is a plan view of the scanning disk.

Rotatable disk 17 (Figs. 1, 2, 3) may well be designated the scanning disk due to its function. This disk may be of any suitable transparent material such as glass or a plastic. A face of the disk is provided with a coating which, as indicated by the stippling in Fig. 3, is of a varying density and imparts to the disk light transmitting properties which vary gradually from practically full transparency at one point to about half that transparency at another point. A straight area or line 40, which may be approximately ⅛ inch in width, is left uncoated for simulation of the scanning line of the radar scope in a manner to be described subsequently.

The point of practically full transparency of disk 17 referred to above is at the leading edge "X" of area or line 40 (Fig. 3), i. e., assuming that the disk is to be rotated in a clockwise direction, while the point of least transparency is at edge "Y" of line 40. The light transmitting characteristics of disk 17 might be described as decreasing progressively in a counter-clockwise direction around the face of the disk from the narrow area 40 where the transparency is substantially 100 per cent to a point adjacent to area 40 in a clockwise direction where the transparency is about 50 per cent.

Backing disk 18 (Figs. 1 and 2) requires no detailed description other than to point out that it is of clear, transparent material, such as glass or plastic, and of a diameter substantially the same as that of disks 22 and 23.

Figure 4:
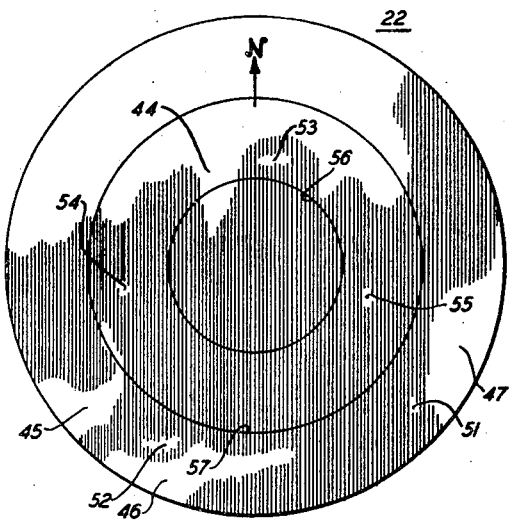
Fig. 4 is a plan view of the terrain disk.

Terrain or image disk 22 (Figs. 1, 2 and 4) is of suitable transparent material such as glass or a plastic and bears a reproduction of the area the simulated scanning of which is to be demonstrated. All radio wave reflecting areas, such as land, ships, etc., are represented on disk 22 by transparent portions while the non-reflecting area, water, is represented by opaque portions. Thus on disk 22, which we will assume is intended for use in simulating the use of radar in scanning an area off the Atlantic coast line, the larger transparent area 44 represents a portion of the mainland, transparent areas 45, 46 and 47 represent islands, area 51 represents a lighthouse, areas 52 and 53 represent ships and areas 54 and 55 represent buoys. The non-reflecting area, the water, is represented by the opaque portion of the disk; this opaque portion is indicated in Fig. 4 by the use of straight, vertical lines.

Disk 22 therefore is divided between light transmitting portions, representing radio wave reflecting areas or objects and opaque portions, representing non-reflecting areas of the terrain.

Range guides 56 and 57 in the form of concentric circles may be marked on disk 22 to simulate similar guides commonly provided on the radar scopes.

Color disk 23 (Figs. 1 and 2) is of suitable transparent material, such as glass or a plastic, and of a diameter substantially the same as that of disks 18 and 22. Disks 18 and 23 serve to hold terrain disk 22 in proper position in housing 11 and to protect the terrain disk. Disk 23 may be colored, if desired, to impart a desired tint to the viewed image or may on occasion be clear glass or plastic, for example, if a "white-black" image as just described is used.

It is customary to provide on certain types of radars scale or range adjusters whereby the range represented by each scale marking, as lines 56 and 57 (Fig. 4), may be changed from one value to another. This adjusting means usually includes, in a position convenient to the observer, an adjusting handle and a dial for indicating the particular adjustment selected. In the present demonstration device there has been provided, in order to make the simulation of an actual radar more realistic, a dummy adjusting lever 71 (Fig. 1) and a dummy indicating dial 72. These are mounted on housing 11 by suitable brackets two of which brackets 73 and 74 are shown in Fig. 1.

Let us assume now that the device is to be used in demonstrating the operation of a plan position radar to a group of observers. That is, the actual operation of a radar when scanning the area represented on terrain disk 22 is to be simulated by the optical means of the present invention.

Figure 5:
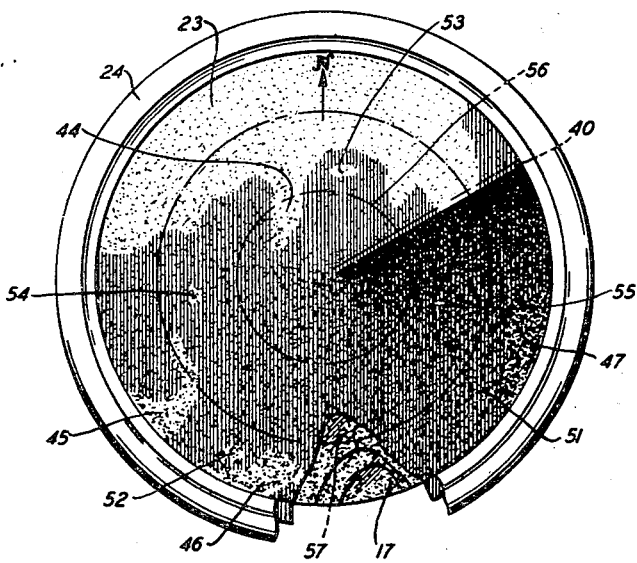
Fig. 5 is a plan view of the face of the demonstration device as seen by the audience, the view being in partial section to show the positioning of the scanning disk in relation to the other disks.

Rotation of scanning disk 17 is started by setting motor 13 into operation and the energizing circuit of lamps 41 and 42 is closed to light the lamps. The speed at which disk 17 is rotated is comparable to the speed at which the scanning antenna of the actual radar would be rotated, and, by way of example, may be of the order of one revolution every three seconds. Now as the observers look in through the open face of housing 11 they will see a simulation of an actual radar image, the simulated view in this instance being as shown in Fig. 5. Clockwise rotation of scanning disk 17 is assumed in the present discussion.

The light coming from lamps 41 and 42 will be passed by the transparent portions of terrain disk 22 but will be blocked by the opaque portions thereof. In the absence of disk 17, therefore, the observers would see simply a light-dark image, the light areas representing the radio wave reflecting parts of the terrain and the dark areas representing the non-reflecting parts of said terrain. The provision of the rotating scanning disk, however, results in a more exact simulation of actual radar operation as it supplies simulation of the rotating scanning beam due to the clear, light transmitting strip 40 as well as decay and build-up of the image resulting from the progressively changing light transmitting properties of the disk.

As shown in Fig. 5, for a particular position of scanning disk 17, we will have a reproduction of terrain disk 22, with complete or substantially complete illumination of those radio wave reflecting areas just scanned, i. e., those adjacent to or near leading edge X of line 40. Thus, as indicated by the stippling (Fig. 5), a large portion of the land 44 will be shown fully illuminated or substantially so while the remote edge of this part of the image will just begin to darken. Ship 53 will be practically fully illuminated. Due to the decreasing light transmission through disk 17, the earlier scanned reflecting areas, such as buoy 54, island 45, ship 52, etc., will be illuminated in progressively decreasing amounts, the first scanned buoy 55 and island 47, being cut down to about one-half the brightness of the areas just scanned.

The condition of the image just described is, of course, an instantaneous condition existing only for the position of the scanning disk illustrated in Fig. 5; as disk 17 rotates we have successive building up and decay of the image together with simulation of a light beam sweeping over the image.

All portions of the image representing non-reflecting areas (water) will be dark at all times regardless of the position of the scanning beam; such dark portions are indicated on Fig. 5 by the straight, vertical lines.

The rate of decay of the image is governed, of course, by the condition of the coating applied to the face of scanning disk 17 and it is obvious that different rates of decay may be demonstrated, as desired, by use of different scanning disks with coatings of the proper nature. This is a particularly valuable feature of the invention as it permits the ready demonstration, for example, of the effects of using different types of cathode ray tubes, with corresponding different decay rates, in an actual radar.

It will also be apparent that any number of different scanned areas may be simulated by the device of the present invention simply by changing the terrain disks. It will be observed that the over-all arrangement of the device is such that all of the disks are readily removed and replaced.

It is contemplated that certain terrain disks will show change in the arrangement of the range markers (as lines 56 and 57, Fig. 4), and it is also contemplated that the art reproduction provided on the image or terrain disk may take a more pictorial form than the "black-white" type described above. That is the entire disk may be transparent and the divisions between the reflecting and non-reflecting areas traced by an opaque line. With such a pattern it will usually be desirable that color disk 23 impart a tint, for example amber or green, to the entire image as viewed. It has been found that in this case the realism of the viewed image is substantially enhanced and the similarity to actual radar performance is more readily appreciated if a tint is imparted to the viewed image in this manner.

It will be apparent that the present invention provides simple, compact and economical means for providing realistic simulation of actual radar operation which includes various advantageous features such as ease of changing from one type of image to another and of changing from simulation of one rate of image decay to another.

The device, due particularly to its compactness and to the fact that it requires no operating supervision, lends itself readily to incorporation in larger and more complicated displays, for example, a relatively large pictorial representation of a plane in flight over a particular terrain might be set up with pictorial indication of radio waves being transmitted to the terrain and reflected back to the plane. Actual operating devices superimposed on the pictorial representation would be a small mechanical duplicate of a radar antenna in addition to the device of the present invention. The antenna would be shown as a separate element actually rotating in synchronism with disk 17 and the image shown on disk 22 would be in accordance with the imaginary terrain shown in the pictorial representation.

While a particular embodiment of the invention has been selected for detailed description, the invention is not of course limited in its application to the embodiment described. The embodiment described should be looked upon as illustrative of the invention and not as restrictive thereof.

What is claimed is:

1. A device for simulating the indicator action of an electronic radar when used in scanning a particular area of terrain comprising a housing, opaque means for closing one end of said housing, a light source positioned within said housing, an image disk closing the other end of said housing, said image disk comprising optically distinct sections corresponding respectively to particular areas of the terrain to be simulated, the sections corresponding to radio-wave-reflecting areas of the terrain being transparent and the sections corresponding to non-radio-wave-reflecting areas being opaque, and means positioned between said disk and said light source for continuously varying between a predetermined maximum and a predetermined minimum the intensity of the light transmitted from said light source to any given point on said disk.

2. A device for simulating the indicator action of an electronic radar when used in scanning a particular area of terrain comprising a housing, opaque means for closing one end of said housing, a light source positioned within said housing, an image disk closing the other end of said housing, said image disk comprising optically distinct sections corresponding respectively to particular areas of the terrain to be simulated, the sections corresponding to radio-wave-reflecting areas of the terrain being transparent and the sections corresponding to non-reflecting areas being opaque, a second disk positioned in the light path between said image disk and said light source, and means for rotating said second disk, the light transmission characteristics of said second disk varying continuously between a point of predetermined maximum transmission and a point of predetermined minimum transmission.

3. A device for simulating the indicator action of an electronic radar when used in scanning a particular area of terrain comprising a housing, opaque means for closing one end of said housing, a light source positioned with said housing, an image disk closing the other end of said housing, said image disk comprising optically distinct sections corresponding respectively to particular areas of the terrain to be simulated, the sections corresponding to radio-wave-reflecting areas of the terrain being transparent and the sections corresponding to non-reflecting areas being opaque, a second disk of transparent material positioned in the light path between said image disk and said light source, means for rotating said second disk, and a coating on a face of said second disk, said coating being of a continuously varying density with corresponding light transmission characteristics varying continuously between a predetermined maximum value and a predetermined minimum value, a comparatively narrow, radial area of said face being free of said coating.

4. A device for simulating by optical means the indicator action of an electronic radar when used in scanning a particular area of terrain comprising a housing, said housing being open at one end, light impervious means for closing the other end of said housing, a light source within said housing, an assembly of disks positioned at the open end of said housing, said disk assembly including an image disk bearing on the face thereof an art reproduction of the particular area of terrain the electronic scanning of which is to be simulated, and means positioned between said light source and said disk assembly for continuously varying between predetermined maximum and minimum values of intensity of light transmitted to said image disk from said light source.

5. A device for simulating by optical means the indicator action of an electronic radar when used in scanning a particular area of terrain comprising a housing, said housing being open at one end, means for closing the other end of said housing, a light source within said housing, an assembly of disks positioned at said open end of said housing, said disk assembly including an image disk bearing on the face thereof an art reproduction of the particular area of terrain the electronic scanning of which by an electronic radar is to be simulated, an additional disk positioned in the light path between said light source and said image disk, said additional disk varying continuously in transparency between a point of predetermined maximum transparency and a point of predetermined minimum transparency, and means for rotating said additional disk.

6. A device for simulating by optical means the indicator action of an electronic radar comprising a housing, said housing being open at one end, a light source within said housing, an assembly of disks positioned at the open end of said housing, said disk assembly including a first disk and a second disk, said first disk bearing a reproduction of the terrain, the scanning of which by an electronic radar is to be simulated, said second disk being tinted to give a desired color value to the viewed image, an additional disk positioned between said disk assembly and said light source, a coating of varying density on portions of a face of said additional disk whereby to impart to said additional disk light transmitting characteristics which decrease progressively in a counter-clockwise direction around said face from a relatively narrow radial area of said face which is uncoated and substantially 100 per cent transparent to a point adjacent to said uncoated area in a clockwise direction of substantially 50 per cent transparency, and means for rotating said additional disk.

7. A device for simulating the image produced by a radar in scanning an area containing radar targets, comprising a translucent plate having map representations thereon showing such targets, and superposed thereon a rotatable disk having a translucency factor varying around the disk in proportion to the angle measured from a radial index line, and means to pass light through said disk and plate.

SCOTT J. McDERMOTT.
HENRY J. KOSTKOS.

REFERENCES CITED

The following references are of record in the file of this patent:

UNITED STATES PATENTS

| Number | Name | Date |
|---|---|---|
| 1,639,918 | Wright | Aug. 23, 1927 |
| 2,200,060 | Geiser | May 7, 1940 |